United States Patent

Morris et al.

[11] 3,719,083
[45] March 6, 1973

[54] FLOWMETERS

[75] Inventors: William Meldrum Morris, Edinburgh, Scotland; Norman Matheson Lindsay, Edgware, England

[73] Assignee: National Research Development Corporation, London, England

[22] Filed: March 29, 1971

[21] Appl. No.: 128,713

[30] Foreign Application Priority Data

April 1, 1970 Great Britain.....................15,546/70

[52] U.S. Cl.....................................................73/204
[51] Int. Cl..............................G01f 1/00, G01p 5/10
[58] Field of Search..........................................73/204

[56] References Cited

UNITED STATES PATENTS

| 3,587,318 | 6/1971 | Belugou | 73/204 X |
| 3,498,128 | 3/1970 | Calvert | 73/204 |

*Primary Examiner*—Richard C. Queisser
*Assistant Examiner*—Herbert Goldstein
*Attorney*—Cushman, Darby & Cushman

[57] ABSTRACT

A flowmeter comprises an electrically resistive sensing element which is heated electrically while exposed to a stream of fluid. The heating power is supplied in the form of a train of identical pulses spaced so that thermal equilibrium between the sensing element and the fluid is achieved before each pulse. Variations in the fluid flow rate are detected by sensing variations in the rate of change of resistance of the sensing element during a pulse.

4 Claims, 4 Drawing Figures

3,719,083

FLOWMETERS

This invention relates to flowmeters of the kind comprising an electrically resistive sensing element which is arranged to be heated electrically while exposed to a stream of fluid under investigation, variations in the rate of flow being detectable by virtue of consequent variations in the resistance of the sensing element.

According to the invention, in a flowmeter of this kind the power for heating the sensing element is arranged to be supplied in the form of a train of identical pulses separated by intervals sufficiently long to ensure that the sensing element is in thermal equilibrium with the fluid at the beginning of each pulse, variations in the rate of flow being detectable by sensing variations in the rate of change of resistance of the sensing element during a pulse.

As compared with conventional flowmeters of the kind specified in which the sensing element is heated continuously, an arrangement according to the invention has the advantages of a reduced power requirement for heating the sensing element and the avoidance of any need to provide a separate compensation system to cater for changes in the temperature of the fluid.

One arrangement in accordance with the invention will now be described by way of example with reference to the accompanying drawings, in which.

Figure 1:
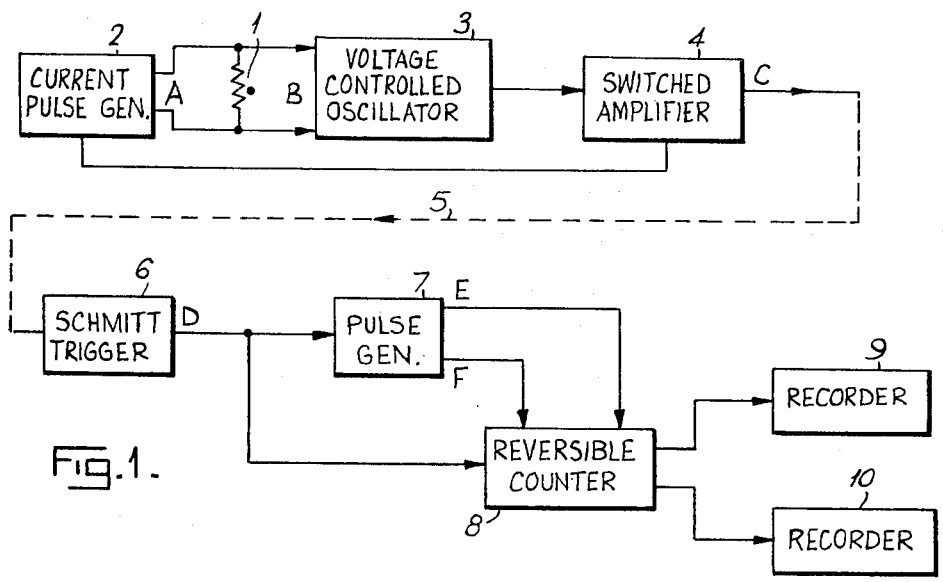
FIG. 1 is a schematic diagram of a system for monitoring the flow of fluid through a conduit.
Figure 2:
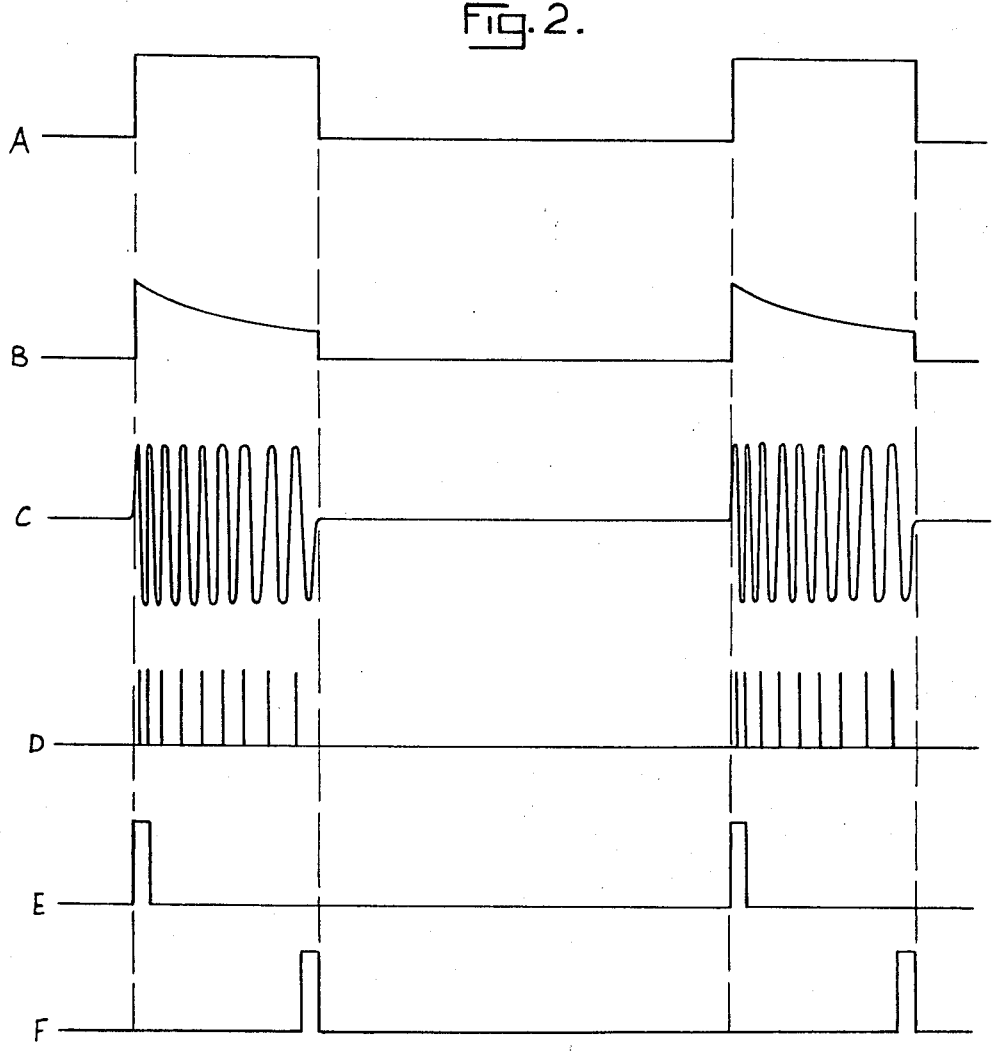
FIG. 2 is a diagram illustrating the waveforms of signals appearing at different points in the system shown in FIG. 1.

Referring to FIG. 1, the system comprises a thermistor 1 which is arranged to be exposed to the stream of fluid in the conduit (not shown); a suitable form of construction for the thermistor 1 is described below. Power is supplied to the thermistor 1 from a generator 2 in the form of a train of regularly recurrent constant current pulses (illustrated at A in FIG. 2). The magnitude of the pulses is such that appreciable self-heating of the thermistor 1 occurs during each pulse, the intervals between pulses being of sufficiently long duration to ensure that the thermistor 1 is in thermal equilibrium with the fluid at the beginning of each pulse, and the duration of each pulse being sufficiently short to ensure that the transfer of heat from the thermistor 1 to the fluid does not reach a steady state by the end of the pulse, that is the temperature of the thermistor 1 increases continuously throughout the length of the pulse; the specific values of the relevant parameters will of course depend on the particular application of the system, but typically a suitable value for the pulse duration might be in the range one to ten milliseconds and a suitable value for the pulse repetition frequency might be in the range 1 to 50 Hz.

A signal in the form of a train of voltage pulses (illustrated at B in FIG. 2) is derived from across the thermistor 1, which in this case has a negative temperature coefficient of resistance. Each pulse of the train B corresponds to one pulse of the train A, and it will be appreciated that during each pulse the voltage appearing across the thermistor 1 will decrease continuously, the rate of change of voltage depending upon the rate at which the temperature of the thermistor 1 increases; this in turn depends upon the rate of loss of heat from the thermistor 1 to the fluid, which is a function of the rate of flow of the fluid past the thermistor 1. Thus, by detecting the slope of individual pulses of the train B, or by detecting the difference between the heights of the leading and trailing edges of each pulse, it is possible to obtain a measure of the rate of flow. Further, the height of the leading edge of each pulse of the train B is dependent upon the temperature of the fluid, so that this parameter can also readily be monitored.

The analysis of the train of pulses B for these purposes could be carried out in various ways, but in the system under consideration the required information is derived using frequency counting techniques. For this purpose, the signal appearing across the thermistor 1 is applied to a voltage controlled oscillator 3 to vary the frequency of oscillation, the output of the oscillator 3 being fed to an amplifier 4 whose gain is switched by means of pulses derived from the generator 2 so as to give an output signal in the form of bursts of oscillation corresponding to the pulses of the train B, the oscillation frequency decreasing continuously during each burst in accordance with the voltage variation in the pulses of the train B. The signal appearing at the output of the amplifier 4 is illustrated at C in FIG. 2; for the sake of clarity, in FIG. 2 only a few cycles of oscillation are shown in each burst, the actual number being much greater. This signal C is fed over a suitable channel 5 to a receiving system incorporating a Schmitt trigger circuit 6, which produces an output signal (illustrated at D in FIG. 2) in the form of bursts of narrow pulses, each pulse corresponding to one cycle of the oscillation in the signal C.

The signal D is applied to a pulse generator 7, which incorporates a system of monostable circuits arranged to produce two further signals (respectively illustrated at E and F in FIG. 2) each of which consists of a train of pulses of repetition frequency equal to that of the train A and having a pulse duration one-tenth of that of the pulses of the train A, the pulses of the train E corresponding in time to the first 10 per cent. of the pulses of the train A and the pulses of the train F corresponding in time to the last 10 per cent. of the pulses of the train A. The signal D is also applied to a reversible pulse counter 8 which is arranged to operate under the control of the signals E and F, the arrangement being such that the counter 8 counts in one direction during each pulse of the train E and counts in the opposite direction during each pulse of the train F, being returned to zero after each pulse in the train F. The pulse count at the end of each pulse of the train E is recorded by means of a recorder 9 to give an indication of the height of the leading edge of each pulse of the train B, and hence of the temperature of the fluid, and the pulse count at the end of each pulse of the train F is recorded by means of a recorder 10 to give an indication of the difference between the heights of the leading and trailing edges of each pulse of the train B, and hence of the rate of flow of the fluid.

Figure 3:
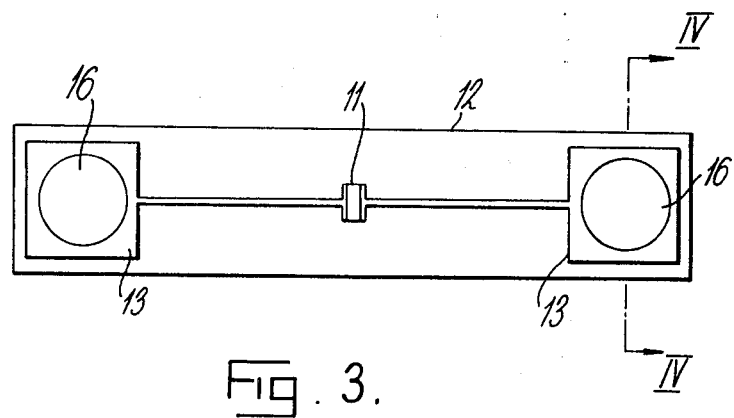
FIG. 3 is a plan view of part of a component suitable for use in the system shown in FIG. 1.
Figure 4:
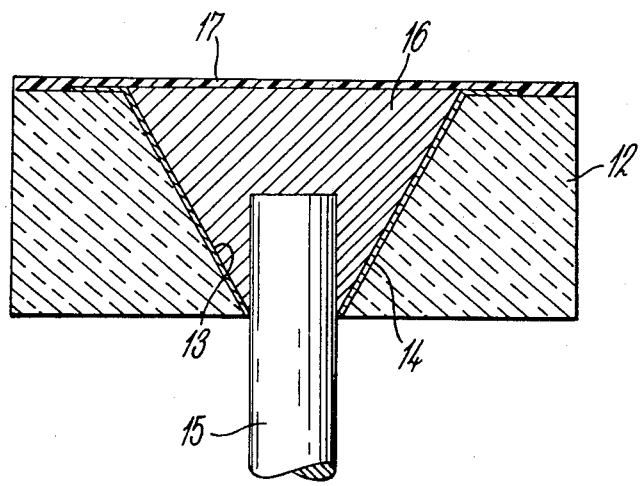
FIG. 4 is an enlarged section on the line IV — IV in FIG. 3.

FIGS. 3 and 4 illustrate a suitable form of construction for the thermistor 1. The sensitive part of the device is constituted by a film 11 of a suitable resistive material (for example a mixture of oxides) which is deposited centrally on one main face of a rectangular glass substrate 12 having a thickness of one mm.; the film 11 may suitably have a thickness of two microns and superficial dimensions of 0.5 mm. by 0.25 mm. Two connections for the film 11 are provided in the form of gold coatings 13 of thickness 0.5 micron which are deposited on the substrate 12. Each coating 13 comprises a portion slightly overlapping the film 11, a portion in the form of a narrow strip extending along the length of the substrate 12 and a portion of enlarged area which covers the surface of a tapered hole 14 (see FIG. 4) passing through the substrate 12 near one end and a surrounding part of the main face of the substrate 12. In the hole 14 is disposed one end of a lead wire 15, which is secured in position and electrically connected to the coating 13 by means of a mass of solder 16. In the completed device the film 11, the coatings 13 and the remainder of the relevant main face of the substrate 12 are covered by an insulating layer 17 of polytetrafluoroethylene eight microns thick; for the sake of clarity the device is shown in FIG. 3 with the layer 17 omitted and the thicknesses of the coating 13 and layer 17 are exaggerated in FIG. 4. In use, the substrate 12 is mounted so as to form part of the wall of the conduit (not shown) in which the flow is to be monitored, with the longitudinal axis of the substrate 12 parallel to that of the conduit and with the lead wires 15 projecting outwardly from the wall.

One specific application envisaged for the system described above is the monitoring of blood flow in an experimental animal, in which case the conduit would be in the form of an artificial blood vessel implanted in the animal together with the circuits 2, 3 and 4, the channel 5 in this case conveniently being constituted by a radio link.

It will be appreciated that, in other embodiments of the invention, instead of using digital techniques to record the information concerning the flow rate it would readily be possible to derive this information in the form of an analogue signal suitable for operating an indicating instrument or for actuating a control or an alarm. Further, instead of using a directly heated sensing element such as the thermistor 1 it would be possible to apply the heating pulses to a separate heater arranged to heat the sensing element.

We claim:

1. A flowmeter comprising:
   electrically resistive sensing means for exposure to a stream of fluid under investigation;
   means for heating the sensing means including means for generating a train of identical electrical pulses having a duration invariant with flow rate separated by intervals sufficiently long to ensure that the sensing means is in thermal equilibrium with the fluid at the beginning of each pulse and means for applying said pulses to said sensing means;
   flow rate sensing means connected to said resistive sensing means including means for measuring an output signal of said resistive sensing means indicating the impedance thereof for a selected interval at the beginning and end of each pulse, and responsive to said signals indicating average rate of change of impedance of said sensing means during each pulse for producing a signal which varies as a function of flow rate.

2. A flowmeter according to claim 1, in which each of said pulses is of duration sufficiently short to ensure that the temperature of the sensing means increases continuously throughout the length of the pulse, and said flow rate sensing means is responsive to the difference between the values of the resistance of the sensing means at the beginning and end of each pulse.

3. A flowmeter according to claim 1, further comprising temperature sensing means responsive to the value of the resistance of the sensing means at the beginning of each pulse.

4. A method of detecting flow rate of a fluid stream comprising the steps of:
   disposing an electrical resistive element in said stream of fluid,
   supplying to said element a train of identical electrical pulses having a duration invariant with flow rate each separated by an interval sufficiently long for the element to be in thermal equilibrium at the beginning of each pulse so that said element is resistively heated by each pulse,
   measuring the impedance of said resistive element for a selected interval at the beginning and end of each pulse,
   detecting the differences in impedance of said resistive element which differences represent the average rate of changes of impedance of said element during each pulse, and
   producing a signal indication of flow rate in response to said differences.

* * * * *